Figure 5:
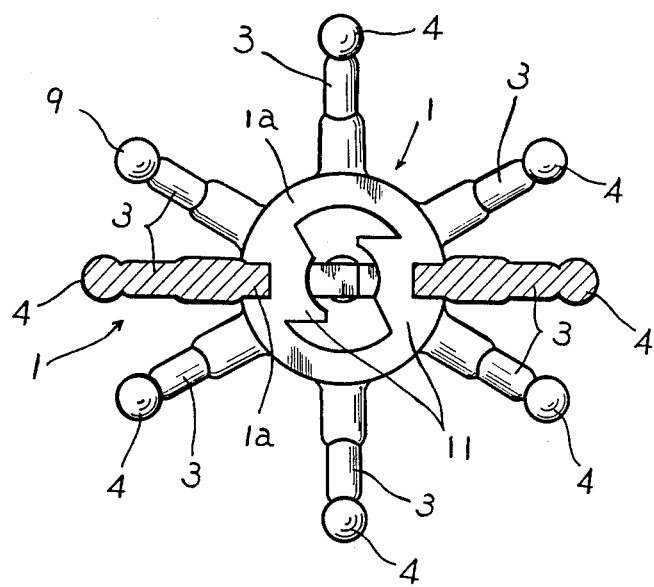

United States Patent [19]

Shima

[11] Patent Number: 4,787,191

[45] Date of Patent: Nov. 29, 1988

[54] ELEMENTS FOR CONSTRUCTING A THREE-DIMENSIONAL STRUCTURE

[76] Inventor: Hiroshi Shima, 2-20, Kuko 1-chome, Ikeda-shi, Osaka Prefecture, Japan

[21] Appl. No.: 69,762

[22] Filed: Jul. 6, 1987

[30] Foreign Application Priority Data

Jul. 8, 1986 [JP] Japan .............................. 61-105142[U]
Feb. 12, 1987 [JP] Japan .............................. 62-19271[U]

[51] Int. Cl.$^4$ ........................................... E04H 12/00
[52] U.S. Cl. .................................... 52/648; 403/171; 403/176; 403/353
[58] Field of Search ......................... 52/648, DIG. 10; 403/171, 172, 174, 176, 178, 353; 446/110, 120, 121, 126

[56] References Cited

U.S. PATENT DOCUMENTS

| | | | |
|---|---|---|---|
| 856,838 | 6/1907 | Bell et al. | 52/648 |
| 2,868,568 | 1/1959 | Frye | 403/171 |
| 3,305,997 | 2/1967 | Keay et al. | 52/648 |
| 3,532,369 | 10/1970 | Reilly | 403/176 |
| 3,648,404 | 3/1972 | Ogsbury et al. | 463/176 X |
| 3,830,011 | 8/1974 | Ochrymowich | 403/171 X |
| 4,078,328 | 3/1978 | Rayment | 446/126 X |

FOREIGN PATENT DOCUMENTS 1390956 1/1965 France .................. 403/171

Primary Examiner—Carl D. Friedman
Assistant Examiner—Creighton Smith
Attorney, Agent, or Firm—Harold Gell

[57] ABSTRACT

This invention discloses elements for constructing a three-dimensional structure, comprising beams that make edges, polygonal plates that make faces and joints with arms that connect said beams and/or polygonal plates with each other so that a desired structure is formed, wherein the end of said joint arms is formed into a spherical shape and bearings which have a grasping means for said spherical and of said joint arms are provided to said beams and polygonal plates so that any of said bearings can be engaged or disengaged with it freely; said joints are formed into at least two shapes from an elastic material so that they can be used singly or in conjunction with the other in connecting said beams and/or polygonal plates; and hooks are provided to each side of said polygonal plates so that said hooks can hold said beams by their sides.

19 Claims, 4 Drawing Sheets

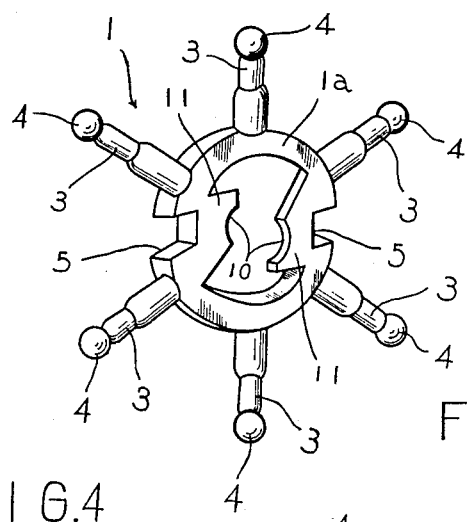
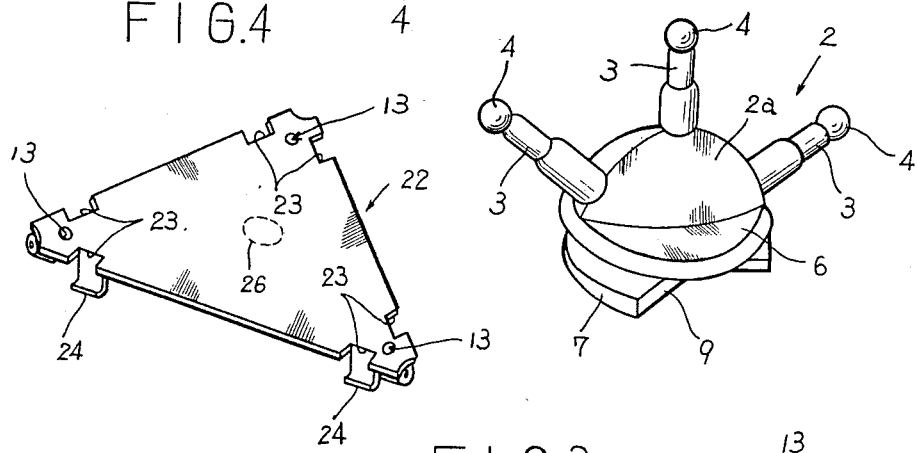
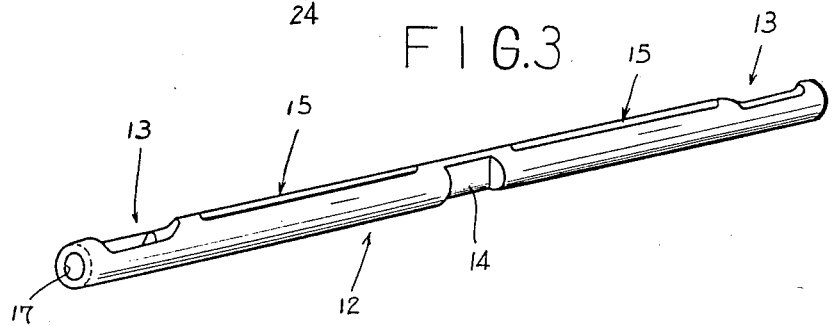

ELEMENTS FOR CONSTRUCTING A THREE-DIMENSIONAL STRUCTURE

This invention relates to a set of elements for constructing a variety of three-dimensional objects. More particularly, it relates to a set of elements by the multiplication of which any solids, such as polygons and polyhedrons can be constructed at a builder's disposal.

So far, in constructing a three-dimensional framework, joints and beams are designed and produced in accordance with that framework beforehand. With this conventional way of construction, elements have to increase in variety and number, as well as in shape and size; as a result, they not only result in the increase of the production cost and time to build up a framework, but also are unsuitable for general use because they are produced case by case.

Contrary to the above, this invention has made it possible to freely build up any polygons or polyhedrons by the use of a few kinds of standardized beams, polygonal plates and joints, wherein the beams are for forming edges and the polygonal plates are for forming faces of a three-dimensional structure and bearings are provided to both of them to hold arms of the joints. Therefore, despite the fact that the beams, polygonal plates and joints are standardized in a few forms, a number of polygonal or polyhedral structures, which never break unless very strong force is applied, can be built up by their multiplication.

It is an object of this invention to provide a new set of elements for building up a variety of three-dimensional objects from which conventional inconveniences and drawbacks are fully eliminated. The above and other objects and features of this invention will appear more fully hereinafter from a consideration of the following description taken in connection with the accompanying drawings wherein one example is illustrated by way of example.

Figure 6:
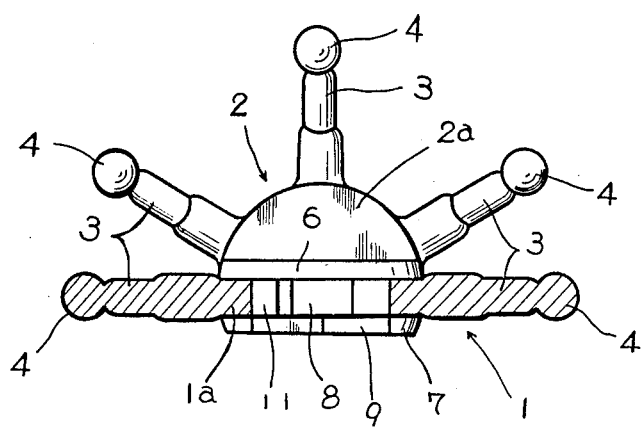
Figure 7:
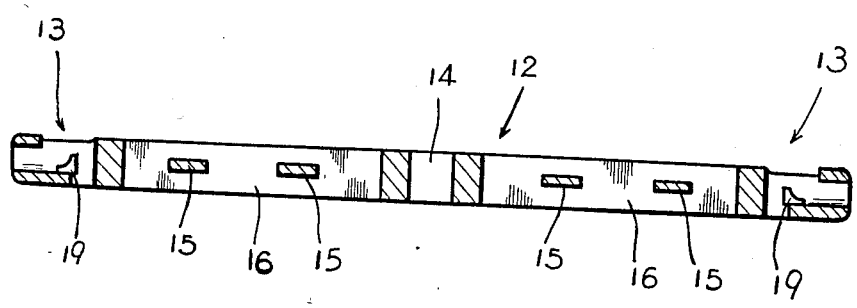
Figure 8:
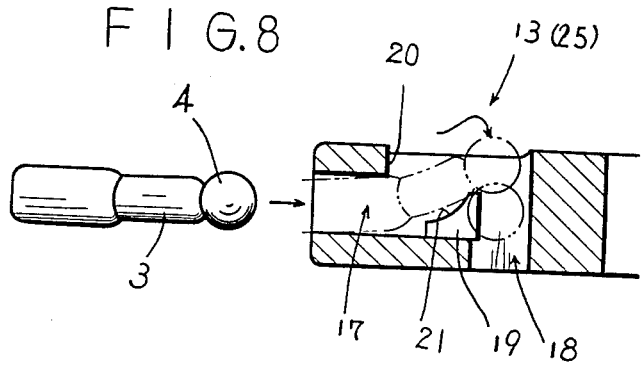
Figure 9:
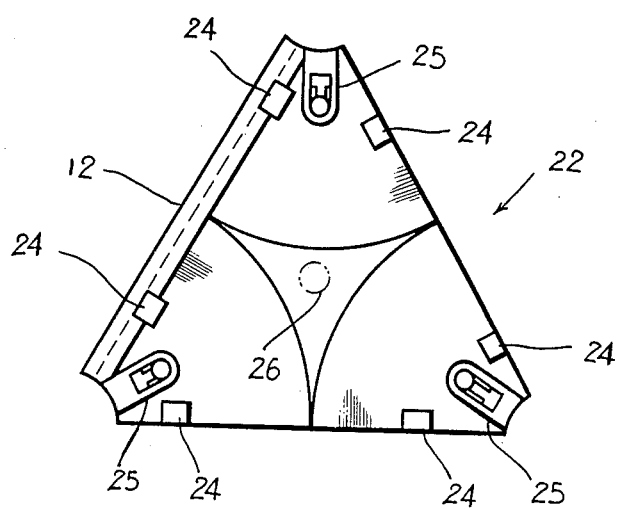
Figure 10:
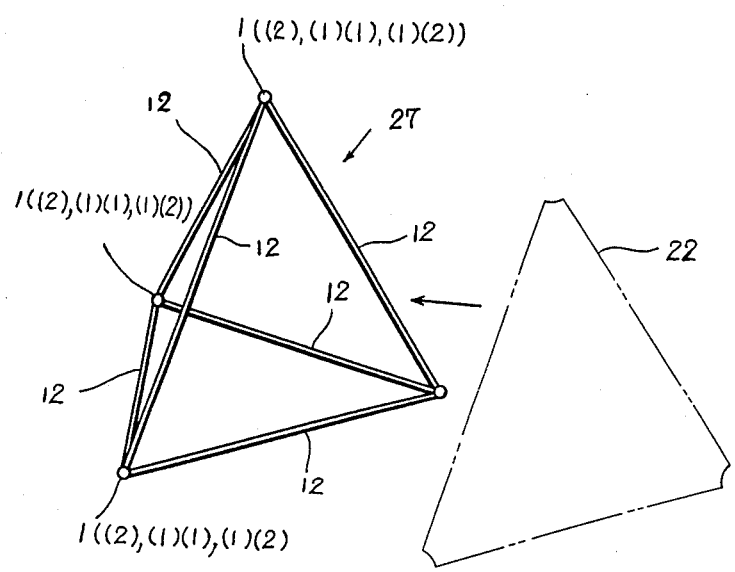
Figure 11:
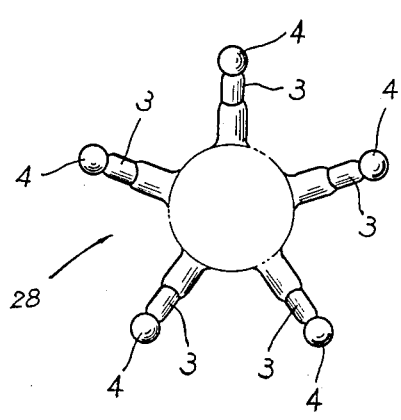
Figure 12:
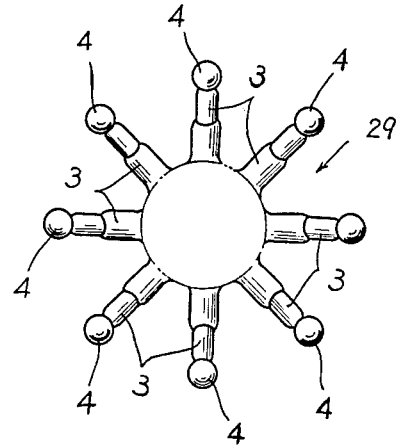

FIG. 1 is a perspective view of a full-circled joint.
FIG. 2 is a perspective view of a semi-circled joint.
FIG. 3 is a perspective view of a a beam.
FIG. 4 is a perspective view of a triangular plate in the character of the polygonal plate mentioned above.
FIG. 5 is an illustration showing the coupling of two full-circled joints.
FIG. 6 is an illustration showing the coupling of a full-circled joint and a semi-circled joint.
FIG. 7 is a longitudinal cross-sectional view of a beam.
FIG. 8 is an enlarged cross-sectional view of a bearing of a beam.
FIG. 9 is a plan view taken from the bottom side of the triangular plate shown in FIG. 4.
FIG. 10 is an illustration showing an assembling process of a regular tetrahedral structure.
FIGS. 11 and 12 are an illustration of a modified full-circled joint.

This invention will be described below in more detail with reference to the accompanying drawings.

FIGS. 1 to 4 are a perspective view of two types of joints, a beam and a triangular plate. In the figures, the numerals 1 and 2 denotes a full-circled joint and a semi-circled joint respectively, which are indispensable for constructing a three-dimensional structure. The full-circled joint 1 has an annular core 1a, on the outside of which six pieces of arms 3 are radially mounted at an equal angular interval, while the semi-circled joint 2 has a semi-annular core 2a, on the outside of which three pieces of arms 3 are radially mounted in the center and on the right and left sides thereof, the cores 1a, 2a and the arms 3 being assembled in one piece. In every arm 3, the middle and the bottom portions are made slightly thicker than the top portion, which is formed into a spherical shape 4 so as to be held by a bearing 13, which will be referred to later. A pair of rectangular notches 5, 5 are provided on the opposing outside of the annular core 1a respectively, as shown in FIG. 1. The width of the notches 5, 5 is made the same as the thickness of the annular core 1a; therefore, two full-circled joints 1, 1 can be coupled with one another in the cruciform, as shown in FIG. 5.

The semi-circled joint 2, which has three arms 3, is provided with two circular plates 6, 7, as shown in FIGS. 2 and 6; the semi-annular core 2a is mounted on the circular plate 6 and the circular plate 7, a part of which is cut off in a fan shape 9, is joined to the circular plate 6 by means of a cylindrical stay 8 in one piece.

A pair of circularly concave ends 10, 10, provided on a pair of projections 11, 11 respectively and opposing vis-a-vis in the middle of the annular core 1a of the full-circled joint 1, are formed in such a way that they can tightly hold the cylindrical stay 8 when the circular plate 7 of the semi-circled joint 2 is put in the middle of the full-circled joint 1 by taking advantage of the cut-off part 9. FIG. 6 shows the annular core 1a of the full-circled joint 1 is put between the circular plates 6, 7 so as to be able to rotate around the cylindrical stay 8 connecting the plates 6, 7. Both the full-circled and the semi-circled joints, including the arms 3, the annular and semi-annular cores 1a, 2a and the circular plates 6, 7 are given respective forms with an elestic and resilient material, such as plastic, so that they can follow deformation given in the process of their coupling.

FIG. 7 shows a beam 12 which forms an edge of a solid, in other words a skeleton of a three-dimensional structure. The length of the beam 12 is standardized in a few varieties. Both ends of the beam 12 are provided with a bearing 13 by which any of the arms 13 of the joints 1, 2 are to be held at a builder's disposal. One side in the middle of the beam 12 is flattened so that there forms a circular cross-sectioned notch 14 for allowing another beam 14 to cross in one plane. Between the notch 14 and the bearing 13 at both ends of the beam 12 is pierced through, except for reinforcements 15, 15.

As shown in FIG. 8, the bearing 13 is comprised of a claw 19, bore 17 to admit the spherical end of the arms 13 in the longitudinal direction and a hole 18 perpendicular to the longitudinal direction. The claw 19 for holding the spherical end 4 of the arms 3 is provided to where the longitudinal bore 17 and the transversal hole 18 meet. The cross-section of the claw 19 is substantially formed into a right triangle whose concave hypotenuse faces toward the entrance of the longitudinal bore 17, so that the hypotenuse serves as a guide 21 for the inserted spherical end 4 of the flexible arm 3 to get out of an opening 20 which extends to the hole 18, as shown by a chain line in FIG. 8.

When the spherical end 4 of the arm 3 is pushed in (from the upper side in FIGS. 7 and 8), the arm 3 and the beam 12 are coupled with each other by the engagement of the neck of the spherical end 4 with the apex of the triangular claw 19. When the spherical end 4 of the arm 3 is pushed out from the other side (from the lower side in FIGS. 7 and 8), the arm 3 and the beam 12 separate from each other by the disengagement of the neck of the spherical end 4 from the apex of the triangular claw 19.

FIGS. 4 and 9 show a triangular plate 22. Provided on each side of the plate 22 are two notches respectively, in which an L-shaped hook 24 is downwardly provided so as to hold the beams 12 forming a skeleton of a framework. That is, according to this example, the triangular plate 22 is designed to be placed in a triangle formed by the beams 12 and the joint 1 or 2, which is alloted to each apex of the triangle.

The triangular plate 22 also has a bearing 25 at each apex on the bottom side, as shown in FIG. 9, the bearing facing toward outside so that it can receive the arms of the joint 1, 2. The hook 24 and the bearing 25, which has the same structure as the bearing 13, are formed in one piece, together with the triangular plate 22, at the center of which a small round thin portion 26 is provided so that two triangular plates 22, 22 can be joined together with bolt and nut if necessary, when the portion 26 is broken with fingers or anything else.

As stated above, the beam 12 and the triangular plate 22 can be joined to the full-circled joint 1 or the semi-circled joint 2; therefore, they can be joined to the assemblage composed of two full-circled joints 1, 1 or a full-circled joint 1 and a semi-circled joint 2 as a matter of course, whereby a good number of various three-dimensional structures can be formed.

For example, when a regular tetrahedron 27 is needed, six pieces of beams 22 of the same length and four pieces of joints 1 or 2 or assembled joint 1,1 or 1,2 are used to make a frame forming the regular tetrahedron, of which each triangle four triangular plates 22 are put in thereafter, as shown in FIG. 10. In such case, what joint to use singly or in combination is left to a builder's election.

Like the regular tetrahedron 27 mentioned above, any regular polyhedrons, polygons, polygonal prisms or the like can be fabricated; at the same time, the same kind or different kind of such three-dimensional structures can be joined together after their fabrication. It is because the joints 1, 2 are made out of an elastic and resilient material, so that they can follow deformation caused by slight difference in the length of sides, the magnitude of apexes or solid angles in a three-dimensional structure, absorbing and diffusing stress resulting from the deformation by their twisting and bending.

The joints, beams and polygonal plates of this invention have such unique functions that they are applicable to assembling toys, teaching materials, mobiles, interior decorations, furniture, camping tents, breeding ground of fish, fishing nets and the like. Other than the above, they can be used as a protective wrapper for flowers or fragile objects, and as a frame of a green house, for example. Like this, their field of application is very wide and almost infinite.

As long as the above example is concerned, the full-circled joint with six arms is the most useful since a triangle is considered a basic unit structure. However, in principle, a joint with five or eight arms shown in FIGS. 11 and 12 are of course applicable in a similar manner. Likewise, a triangular plate having flat surface is replaceable with the one having curved or spherical surface; besides, it can be replaced with a square, rectangular, pentagonal plate or the like.

As apparent from the above, according to this invention, a beam, a polygonal plate, full-circled and semi-circled joints serve to build up a wide variety of three-dimensional structures as a construction unit, which is standardized in far less varieties and makes their construction much easier than before. More than that, a built-up framework is so strongly assembled that they never break unless very strong force is applied to them intentionally.

What is claimed is:

1. Elements for constructing a three-dimensional structure, which comprises beams that make edges, polygonal plates that make faces and joints with arms that connect said beams and/or said polygonal plates with each other so that a desired structure is formed, and said polygonal plates include hooks at each side for holding said beams by said sides.

2. Elements as claimed in claim 1, wherein bearings are provided to said beams and said polygonal plates, and the end of joint arms is formed into a spherical shape so that any of said bearings can be engaged or disengaged with it freely.

3. Elements as claimed in claim 1, wherein said joints are formed into at least two shapes from an elastic material so that they can be used singly or in conjunction with the other in connecting said beams and/or said polygonal plates.

4. Elements as claimed in claim 2, wherein said bearings are provided with a grasping means for said spherical end of said joint arms.

5. A three-dimensional structure, comprising:
joint means including a plurality of connecting arms emanating from the exterior surface thereof;
said connecting arms including a spherical locking member at the end opposite said joint means;
said joint means including interlocking means for mechanically securing a plurality of joint means together;
a plate including at least two straight edges forming a corner and means for retaining one of said spherical locking members located at said corner; and
a beam terminated at each end by a means for retaining one of said spherical locking members and including a longitudinal slot for receiving one of said edges of said plate.

6. A three-dimensional structure as defined in claim 5 wherein said plate includes clip means for securing said beam when said edge of said plate is within said slot of said beam.

7. A three-dimensional structure as defined in claim 5 wherein said plate includes a knockout bore whereby objects may be bolted to said plate when the knock out is removed.

8. A three-dimensional structure as defined in claim 5 wherein said plate is triangular.

9. A three-dimensional structure as defined in claim 5 wherein said joint is disk shaped with said arms radiating in the same plane as the disk.

10. A three-dimensional structure as defined in claim 5 wherein said joint is hemisphercal with said arms radiating from the dome of the hemisphere.

11. A three-dimensional structure as defined in claim 5 wherein sad beam is tubular.

12. A three-dimensional structure, comprising:
a plurality of joint means, each including connecting arms emanating from an exterior surface thereof;
the free end of said connecting arms terminated by spherical locking members;
said joint means including interlocking means for mechanically securing at least two of said joint means together;

a plurality of plates, each including at least two straight edges forming a corner and means for retaining said spherical locking members located at said corner; and a plurality of beams, each terminated at each end by a mean for retaining said spherical locking members and including a longitudinal slot for receiving one of said edges of one of said plates.

13. A three-dimensional structure as defined in claim 12 wherein said plates include clip means for securing said beams when an edge of a plate is within a slot of said beam.

14. A three-dimensional structure as defined in claim 12 wherein said plates include a knockout bore whereby objects may be bolted to said plate when the knock out is removed.

15. A three-dimensional structure as defined in claim 12 wherein at least one of said plates is triangular.

16. A three-dimensional structure as defined in claim 12 wherein at least one of said joints is disk shaped with said arms radiating in the same plane as the disk.

17. A three-dimensional structure as defined in claim 12 wherein at least one of said joints is hemispherical with said arms radiating from the dome of the hemisphere.

18. A three-dimensional structure as defined in claim 12 wherein at least one of said beams is tubular.

19. A three-dimensional structure as defined in claim 12 wherein at least one of said joints is disk shaped with said arms radiating in the same plane as the disk and at least on of said joints is hemispherical with said arms radiating from the dome of the hemisphere.

* * * * *